US010775804B1

United States Patent
Eade et al.

(10) Patent No.: US 10,775,804 B1
(45) Date of Patent: Sep. 15, 2020

(54) OPTICAL ARRAY SENSOR FOR USE WITH AUTONOMOUS VEHICLE CONTROL SYSTEMS

(71) Applicant: Aurora Innovation, Inc., Palo Alto, CA (US)

(72) Inventors: Ethan Eade, Pittsburgh, PA (US); Nathaniel Gist, IV, Pittsburgh, PA (US); Thomas Pilarski, Palo Alto, CA (US)

(73) Assignee: Aurora Innovation, Inc., Palo Alto, CA (US)

( * ) Notice: Subject to any disclaimer, the term of this patent is extended or adjusted under 35 U.S.C. 154(b) by 154 days.

(21) Appl. No.: 15/949,767

(22) Filed: Apr. 10, 2018

(51) Int. Cl.
| | |
|---|---|
| G06K 9/00 | (2006.01) |
| G05D 1/02 | (2020.01) |
| G06T 7/292 | (2017.01) |
| G06T 3/40 | (2006.01) |
| G05D 1/00 | (2006.01) |

(52) U.S. Cl.
CPC ......... *G05D 1/0253* (2013.01); *G05D 1/0088* (2013.01); *G06T 3/4038* (2013.01); *G06T 7/292* (2017.01); *G05D 2201/0213* (2013.01); *G06T 2207/10048* (2013.01); *G06T 2207/10152* (2013.01); *G06T 2207/20221* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 3,897,846 A | 8/1975 | Inoue | |
| 3,902,686 A | 9/1975 | Wykes | |
| 6,547,343 B1 | 4/2003 | Hac | |
| 7,054,467 B1 | 5/2006 | Honda | |
| 8,862,333 B2 | 10/2014 | Andres | |
| 10,046,770 B1 | 8/2018 | Sabri | |
| 10,247,816 B1 | 4/2019 | Hoffman | |
| 2003/0042790 A1 | 3/2003 | Amberkar | |
| 2007/0005212 A1 | 1/2007 | Xu | |
| 2007/0021896 A1 | 1/2007 | O'Dea | |
| 2009/0105900 A1 | 4/2009 | Tan | |
| 2014/0067240 A1 | 3/2014 | Yu | |
| 2018/0259976 A1* | 9/2018 | Williams | ................ G06F 16/29 |
| 2018/0284782 A1* | 10/2018 | Kalabic | ................ B60W 30/06 |
| 2019/0147267 A1 | 5/2019 | Aizawa | |

OTHER PUBLICATIONS

Intech: "Optical Speed Measurement and applications" Frontiers in Robotics, Automation and Control, Oct. 1, 2008.
Kistler Group, "Correvit S-Motion Non-Contact Optical Sensors" 2014.

(Continued)

*Primary Examiner* — Wei Wen Yang
(74) *Attorney, Agent, or Firm* — Middleton Reutlinger

(57) ABSTRACT

A downwardly-directed optical array sensor may be used in an autonomous vehicle to enable a velocity (e.g., an overall velocity having a direction and magnitude, or a velocity in a particular direction, e.g., along a longitudinal or lateral axis of a vehicle) to be determined based upon images of a ground or driving surface captured from multiple downwardly-directed optical sensors having different respective fields of view.

28 Claims, 7 Drawing Sheets

(56) References Cited

OTHER PUBLICATIONS

Teledyne Dalsa: "Understanding Line Scan Camera Applications" 2014.
Tuononen, Ari J.: Sensors; "Vehicle Lateral State Estimation Based on Measured Tyre Forces" www.mdpi.com/journal/sensors, Oct. 30, 2009.
United States Patent and Trademark Office, Office Action for U.S. Appl. No. 15/949,759 dated Jan. 13, 2020.
United States Patent and Trademark Office, Notice of Allowance for U.S. Appl. No. 15/949,759 dated Apr. 22, 2020.

* cited by examiner

OPTICAL ARRAY SENSOR FOR USE WITH AUTONOMOUS VEHICLE CONTROL SYSTEMS

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

A fundamental challenge of any autonomy-related technology relates to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

SUMMARY

The present disclosure is directed in part to a downwardly-directed optical array sensor that may be used in an autonomous vehicle to enable a velocity (e.g., an overall velocity having a direction and magnitude, or a velocity in a particular direction, e.g., along a longitudinal or lateral axis of a vehicle) to be determined based upon images of a ground or driving surface captured from multiple downwardly-directed optical sensors having different respective fields of view.

Therefore, consistent with one aspect of the invention, a method of autonomously operating a vehicle may include receiving a plurality of images of a ground surface captured from a plurality of downwardly-directed optical sensors mounted to the vehicle, each of the plurality of downwardly-directed optical sensors having a respective field of view, and the plurality of downwardly-directed optical sensors arranged such that the respective fields of view differ from one another, processing the plurality of images using at least one processor to determine a velocity of the vehicle, and autonomously controlling movement of the vehicle using the determined velocity.

In some embodiments, at least a subset of the plurality of downwardly-directed optical sensors are arranged to have respective fields of view that are positionally offset along a one-dimensional array. In addition, in some embodiments, at least a subset of the plurality of downwardly-directed optical sensors are arranged to have respective fields of view that are positionally offset in a two-dimensional array. Moreover, in some embodiments, the one-dimensional array extends generally along a longitudinal axis of the vehicle. Also, in some embodiments, the respective fields of view of at least a subset of the plurality of downwardly-directed optical sensors partially overlap with one another.

In some embodiments, processing the plurality of images includes correlating first and second images respectively captured at first and second times by a first downwardly-directed optical sensor among the plurality of downwardly-directed optical sensors to determine a positional displacement of the vehicle between the first and second times, and determining the velocity based upon the determined positional displacement of the vehicle between the first and second times.

Also, in some embodiments, the subset of downwardly-directed optical sensors arranged to have respective fields of view that are positionally offset along the one-dimensional array includes first and second downwardly-directed optical sensors, and processing the plurality of images includes correlating a first image captured at a first time by the first downwardly-directed optical sensor with a second image captured at a second time by the second downwardly-directed optical sensor to determine a positional displacement of the vehicle between the first and second times, and determining the velocity based upon the determined positional displacement of the vehicle between the first and second times.

Moreover, in some embodiments, the subset of downwardly-directed optical sensors arranged to have respective fields of view that are positionally offset along the one-dimensional array includes first and second downwardly-directed optical sensors, and processing the plurality of images includes performing a first correlation between a first image captured at a first time by the first downwardly-directed optical sensor and a second image captured at a second time by the first downwardly-directed optical sensor, performing a second correlation between the first image captured at the first time by the first downwardly-directed optical sensor and a third image captured at a third time by the second downwardly-directed optical sensor, using one of the first and second correlations to determine a positional displacement of the vehicle between the first time and one of the second and third times, and determining the velocity based upon the determined positional displacement. In some embodiments, the second and third times are substantially the same. Moreover, in some embodiments, using the one of the first and second correlations to determine the positional displacement includes using the first correlation in response to determining that the second image could be correlated to the first image, and using the second correlation in response to determining that the third could be correlated to the first image.

In some embodiments, the subset of downwardly-directed optical sensors arranged to have respective fields of view that are positionally offset along the one-dimensional array includes more than two downwardly-directed optical sensors. Further, in some embodiments, the one-dimensional array extends generally along a longitudinal axis of the vehicle, and the subset of downwardly-directed optical sensors arranged to have respective fields of view that are positionally offset along the one-dimensional array collectively provide an effective aperture that is larger along the longitudinal axis of the vehicle than along a lateral axis of the vehicle.

Moreover, in some embodiments, the plurality of images includes images captured at a plurality of times by each of the subset of downwardly-directed optical sensors. Also, in some embodiments, processing the plurality of images includes stitching together multiple images from each of the plurality of times to generate a composite image for each of the plurality of times, correlating a first composite image for a first time among the plurality of times with a second composite image for a second time among the plurality of times to determine a positional displacement of the vehicle between the first and second times, and determining the velocity based upon the determined positional displacement of the vehicle between the first and second times. In some embodiments, the respective fields of view of the subset of downwardly-directed optical sensors partially overlap with one another, and stitching together the multiple images from each of the plurality of times includes correlating overlapping regions of the multiple images. Also, in some embodiments, the plurality of times are within a single control cycle among a plurality of control cycles.

Moreover, in some embodiments, the plurality of downwardly-directed optical sensors are coupled to a primary vehicle control system of the vehicle, the primary vehicle control system includes the at least one processor, and receiving the plurality of images, processing the plurality of images, and autonomously controlling movement of the vehicle are performed by the primary vehicle control system.

Also, in some embodiments, the plurality of downwardly-directed optical sensors are coupled to a secondary vehicle control system of the vehicle, the secondary vehicle control system includes the at least one processor, and receiving the plurality of images, processing the plurality of images, and autonomously controlling movement of the vehicle are performed by the second vehicle control system subsequent to detection of an adverse event for a primary vehicle control system of the vehicle.

Further, in some embodiments, the plurality of downwardly-directed optical sensors are disposed on an undercarriage of the vehicle. Also, in some embodiments, determining the velocity includes determining a lateral velocity of the vehicle. Moreover, in some embodiments, determining the velocity includes determining a longitudinal velocity of the vehicle. In some embodiments, determining the velocity includes determining a magnitude component and a direction component of the velocity.

Moreover, in some embodiments, the vehicle includes a fully autonomous vehicle. Further, in some embodiments, the vehicle includes an autonomous wheeled vehicle. In addition, in some embodiments, the vehicle includes an autonomous automobile, bus or truck. Also, in some embodiments, the plurality of downwardly-directed optical sensors are infrared sensors. Some embodiments may further include capturing the plurality of images with the plurality of downwardly-directed optical sensors, and illuminating the ground surface with a strobe emitter when capturing the plurality of images.

Consistent with another aspect of the invention, a vehicle control system may include a plurality of downwardly-directed optical sensors configured to be mounted to a vehicle to capture images of a ground surface, each of the plurality of downwardly-directed optical sensors having a respective field of view, and the plurality of downwardly-directed optical sensors arranged such that the respective fields of view differ from one another, and at least one processor coupled to the plurality of downwardly-directed optical sensors, the at least one processor configured to receive a plurality of images of the ground surface captured from the plurality of downwardly-directed optical sensors, process the plurality of images to determine a velocity of the vehicle, and autonomously control movement of the vehicle using the determined velocity.

Consistent with another aspect of the invention, a vehicle may include a plurality of downwardly-directed optical sensors configured to be mounted to a vehicle to capture images of a ground surface, each of the plurality of downwardly-directed optical sensors having a respective field of view, and the plurality of downwardly-directed optical sensors arranged such that the respective fields of view differ from one another, and at least one processor coupled to the plurality of downwardly-directed optical sensors, the at least one processor configured to receive a plurality of images of the ground surface captured from the plurality of downwardly-directed optical sensors, process the plurality of images to determine a velocity of the vehicle, and autonomously control movement of the vehicle using the determined velocity.

Consistent with another aspect of the invention, a method of autonomously operating a vehicle may include receiving a plurality of images of a ground surface captured from a plurality of downwardly-directed optical sensors mounted to the vehicle, each of the plurality of downwardly-directed optical sensors having a respective field of view, and the plurality of downwardly-directed optical sensors arranged such that the respective fields of view differ from one another, processing the plurality of images using at least one processor to determine a velocity of the vehicle, and autonomously controlling movement of the vehicle using the determined velocity.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The various implementations discussed hereinafter are directed to autonomous vehicle control systems and sensors for use therewith. In some implementations, for example, controlled stop functionality may be implemented in an autonomous vehicle using a secondary vehicle control system that supplements a primary vehicle control system to perform a controlled stop if an adverse event is detected in the primary vehicle control system, and using a redundant lateral velocity determined by a different sensor from that used by the primary vehicle control system. In addition, in some implementations, a downwardly-directed optical array sensor may be used in an autonomous vehicle to enable a velocity (e.g., an overall velocity having a direction and magnitude, or a velocity in a particular direction, e.g., along a longitudinal or lateral axis of a vehicle) to be determined based upon images of a ground or driving surface captured from multiple downwardly-directed optical sensors having different respective fields of view.

Prior to a discussion of these implementations, however, an example hardware and software environment within which the various techniques disclosed herein may be implemented will be discussed.

Hardware and Software Environment

Figure 1:
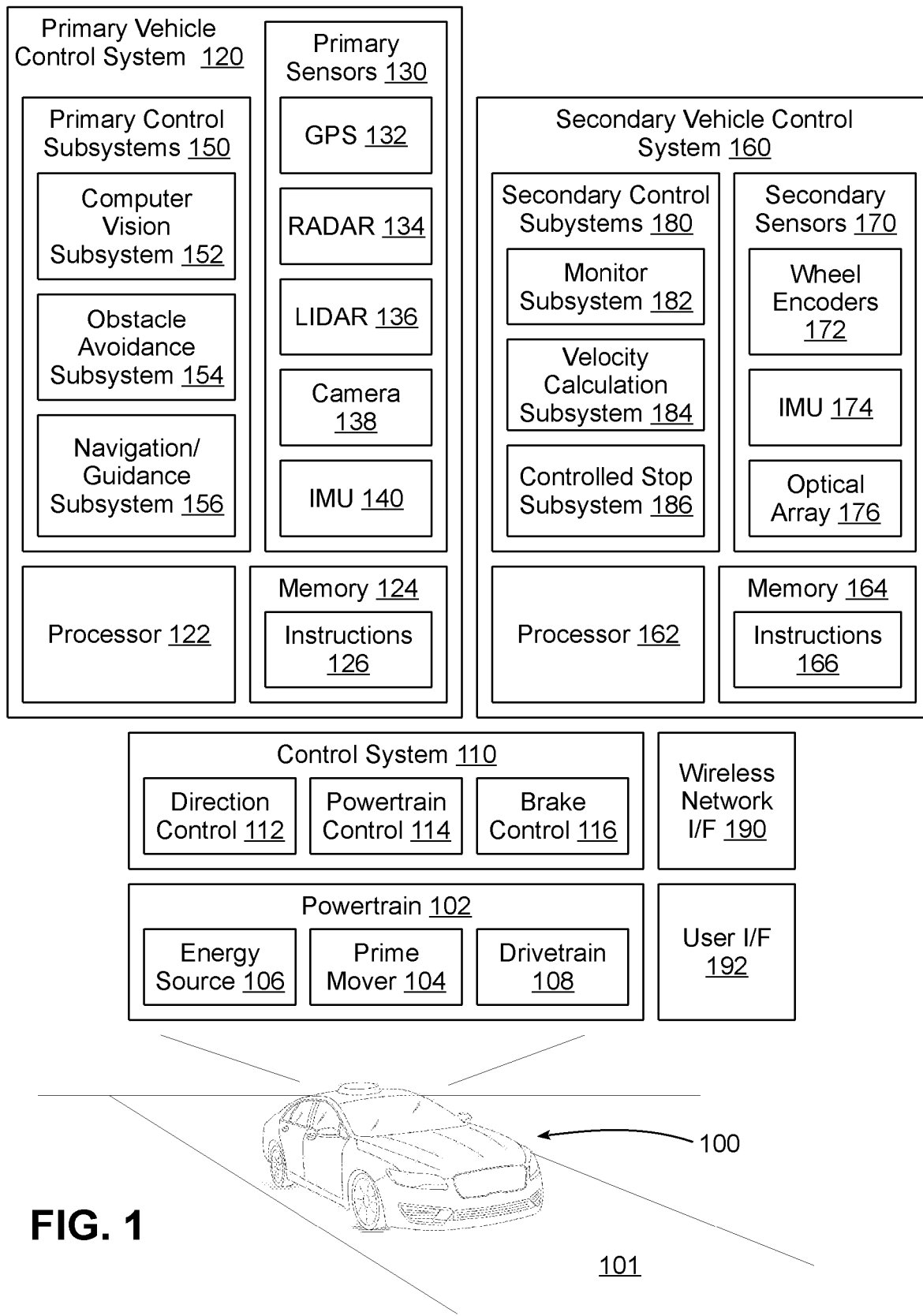
FIG. 1 illustrates an example hardware and software environment for an autonomous vehicle.

Turning to the Drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114 and brake control 116. Vehicle 100 may be implemented as any number of different types of land-based vehicles, including vehicles capable of transporting people and/or cargo, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, full or semi-autonomous control over vehicle 100 is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from a vehicle's surrounding environment for use in controlling the operation of the vehicle. For example, a global positioning system (GPS) sensor 132 may be used to determine the location of the vehicle on the Earth. Radio Detection And Ranging (RADAR) and Light Detection and Ranging (LIDAR) sensors 134, 136, as well as a digital camera 138, may be used to sense stationary and moving objects within the immediate vicinity of a vehicle. An inertial measurement unit (IMU) 140 may include multiple gyroscopes and accelerometers capable of detection linear and rotational motion of a vehicle in three directions.

The outputs of sensors 132-140 may be provided to a set of primary control subsystems 150, including, a computer vision subsystem 152, an obstacle avoidance subsystem 154 and a navigation/guidance subsystem 156. Computer vision subsystem 152 may be configured to take the input from RADAR sensor 134, LIDAR sensor 136 and/or digital camera 138 to detect and identify objects surrounding the vehicle, as well as their motion relative to the vehicle. Obstacle avoidance subsystem 154 may use this information to detect stationary and/or moving obstacles in the vicinity of the vehicle that should be avoided. Navigation/guidance subsystem 156 determines a trajectory and speed for the vehicle based upon the desired destination and path and the detected obstacles in the vicinity of the vehicle.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-156 are illustrated as being separate from processors 122 and memory 124, it will be appreciated that in some implementations, some or all of the functionality of a subsystem 152-156 may be implemented with program code instructions 126 resident in one or more memories 124 and executed by one or more processors 122, and that these subsystems 152-156 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In the illustrated implementation, vehicle 100 also includes a secondary vehicle control system 160, which may include one or more processors 162 and one or more memories 164 capable of storing instructions 166 for execution by processor(s) 162. Secondary vehicle control system 160, as will be discussed in greater detail below, may be used as a redundant or backup control system for vehicle 100, and may be used, among other purposes, to perform controlled stops in response to adverse events detected in primary vehicle control system 120.

Secondary vehicle control system 160 may also include a secondary sensor system 170 including various sensors used by secondary vehicle control system 160 to sense the condition and/or surroundings of vehicle 100. For example, one or more wheel encoders 172 may be used to sense the velocity of each wheel, while an IMU sensor 174 may be used to generate linear and rotational motion information about the vehicle. In addition, and as will be discussed in greater detail below, a downwardly-directed optical array sensor 176 may be used to sense vehicle motion relative to a ground or driving surface. Secondary vehicle control system 160 may also include several secondary control subsystems 180, including a monitor subsystem 182, which is used to monitor primary vehicle control system 120, a velocity calculation subsystem 184, which is used to calculate at least a lateral velocity for the vehicle, and a controlled stop subsystem 186, which is used to implement a controlled stop for vehicle 100 using the lateral velocity determined by velocity calculation subsystem 184 upon detection of an adverse event by monitor subsystem 182. Other sensors and/or subsystems that may be utilized in secondary vehicle control system 160, as well as other variations capable of being implemented in other implementations, will be discussed in greater detail below.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include an interface 190 with one or more networks (e.g., a LAN, a WAN, a wireless network, and/or the Internet, among others) to permit the communication of information with other computers and electronic devices, including, for example, a central service, such as a cloud service, from which vehicle 100 receives map and other data for use in autonomous control thereof. Moreover, a user interface 192 may be provided to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Lateral Velocity Determinations for Controlled Stops

As noted above, a fundamental challenge of any autonomy-related technology relates to collecting and interpreting information about a vehicle's surroundings, along with making and implementing decisions to appropriately control the vehicle given the current environment within which the vehicle is operating. Continuing efforts are being made to improve each of these aspects, and by doing so, autonomous vehicles increasingly are able to reliably handle a wider variety of situations and handle more unknown or unexpected events.

Despite these advances, however, autonomous vehicle control systems, as with practically all electronic systems, are not completely immune from hardware and/or software failures from time to time. Sensors can fail, as can processors, power supplies, and other hardware components, and software can sometimes hang or otherwise cause a hardware system to become unresponsive. These various types of adverse events can, in some instances, lead to a partial or full inability of a vehicle control system to control a vehicle in a desired fashion.

It has been proposed, for example, for autonomous vehicles to support "controlled stop" functionality, whereby a vehicle will perform a controlled maneuver to bring the vehicle to a stopped condition regardless of any adverse event in the vehicle. A controlled stop of this nature generally requires, at the least, an ability to sense the velocity of the vehicle. A wide variety of existing sensors can generally sense longitudinal velocity (i.e., velocity along a longitudinal axis of the vehicle, generally the speed of the vehicle in its primary direction of movement); however, lateral velocity (i.e., the speed of the vehicle in a direction generally transverse to the primary direction of movement) can be more difficult to sense and/or determine, particularly without the use of more sophisticated sensors than can be used for determining longitudinal velocity. Moreover, lateral velocity is generally much smaller than longitudinal velocity, but still even a relatively small lateral velocity can result in a vehicle not following a desired path, and potentially causing a vehicle to stray into adjacent lanes or obstacles during a controlled stop. As an example, wheel encoders may be used to estimate longitudinal velocity; however, any misalignment or tilt of the wheels may cause a vehicle to change orientation and thus depart from a desired path. Therefore, a need exists for a manner of determining lateral velocity in connection with performing a controlled stop.

Thus, in some implementations consistent with the invention, one or more additional sensors that are separate from a primary lateral velocity sensor of a primary vehicle control system for a vehicle may be utilized to determine a lateral velocity for the vehicle that may be used by a secondary vehicle control system to control the vehicle in response to an adverse event detected in a primary vehicle control system (e.g., a hardware and/or software failure in the primary vehicle control system, a failure in one or more of the primary sensors, a power supply failure in the primary vehicle control system, etc.). The control by the secondary control system may be used, for example, to execute a controlled stop of the vehicle, and thus bring the vehicle to a stop if the primary vehicle control system is not fully capable of operating the vehicle. In some implementations therefore an autonomous vehicle may be operated by a secondary vehicle control system having access to one or more additional sensors that are different from the primary lateral velocity sensor of the vehicle yet may be used to determine at least lateral velocity.

A primary lateral velocity sensor, in this regard, may be considered to include any type of sensor used by a primary vehicle control system to sense or otherwise determine the lateral velocity of the vehicle. A primary lateral velocity sensor may, in some instances, be a sensor that is exclusively dedicated to sensing lateral velocity, while in other instances, a primary lateral velocity sensor may sense lateral velocity along with additional vehicle parameters. In the illustrated implementation, for example, a LIDAR sensor such as LIDAR sensor may determine lateral velocity among a wide variety of other vehicle parameters in connection with determining a pose of the vehicle.

In addition, the aforementioned one or more additional sensors may include various types of sensors capable of sensing lateral velocity. In this regard, the lateral velocity determined using the one or more additional sensors is referred to herein as a redundant lateral velocity insofar as the redundant lateral velocity is separately determined from the lateral velocity determined from the primary lateral velocity sensor. As with the primary lateral velocity sensor, any of such additional sensors may also be capable of determining additional vehicle parameters beyond lateral velocity (e.g., longitudinal velocity, acceleration, etc.). Furthermore, a secondary vehicle control system may also rely on other sensors when performing a controlled stop in some instances, including, for example, wheel encoders, IMUs, etc., for determining longitudinal velocity. As a result, the secondary vehicle control system may, in some instances, execute a controlled stop independent of the primary vehicle control system.

It will be appreciated that lateral velocity may be determined and represented in a number of manners consistent with the invention. For example, lateral velocity may be represented in some instances by a magnitude and direction (which may be indicated by a positive or negative magnitude) of the vehicle velocity along a lateral axis of the vehicle (i.e., the axis that is orthogonal to a longitudinal axis of the vehicle representing the axis along which the vehicle travels when traveling in a straight line). Alternatively, the lateral velocity may be represented as a lateral component of an overall velocity of the vehicle represented by an angular direction and magnitude along that angular direction. Thus, a sensor that senses lateral velocity in some implementations is not necessarily limited to sensing only velocity along a lateral axis, but may instead be a sensor that senses an overall velocity (i.e., direction/heading and magnitude/speed) from which a lateral component thereof may be determined.

In various implementations, the primary and secondary vehicle control systems may be completely independent from one another in terms of both hardware and software, e.g., as illustrated by primary and secondary vehicle control systems 120, 160 in FIG. 1, to provide for completely independent operation of secondary vehicle control system 160 in response to an adverse event associated with primary vehicle control system 120. Further, in some implementations, the secondary vehicle control system may be limited to functionality for performing controlled stops, e.g., in terms of being a functionally-limited, less sophisticated, and less expensive backup vehicle control system. However, the invention is not limited to such implementations.

For example, in some implementations, secondary vehicle control system may have comparable functionality to primary vehicle control system, or in the least may have additional control functionality beyond performing controlled stops, such that the secondary vehicle control system operates as a redundant vehicle control system or otherwise is capable of taking over control of a vehicle to resume operations previously controlled by the primary vehicle control system, and potentially without any perceptible loss of control or functionality. Thus, a secondary vehicle control system can have a wide range of functionality in different implementations.

Moreover, while primary and secondary vehicle control systems 120, 160 of FIG. 1 are illustrated as utilizing separate hardware, software and sensors, in other implementations primary and secondary vehicle control systems can share some hardware, software and/or sensors, so long as the secondary vehicle control system is still capable of initiating a controlled stop in response to an adverse event in the primary vehicle control system that inhibits the primary vehicle control system from continuing to control the vehicle in a desirable manner.

For example, one or more primary and/or secondary sensors may be shared by (or otherwise in communication with) both a primary and secondary vehicle control system in some implementations. Thus, for example, in some implementations, at least some of the secondary sensors may be accessible to the primary vehicle control system, e.g., for verifying or cross-checking vehicle parameters calculated by different sensors, for using secondary vehicle control system sensors in the primary control of the vehicle, for monitoring the status of sensors, or for serving as redundant sensors capable of being used when other sensors of the same type fail, etc. Furthermore, in some implementations, one or more sensors may not be dedicated to the primary or secondary vehicle control system, but may be separate from both systems yet accessible to one or both of the systems. Furthermore, from the perspective of an additional sensor from which lateral velocity may be determined in connection with performing a controlled stop, the additional sensor may be any sensor that may or may not be accessible to the primary vehicle control system (whether a primary sensor, a secondary sensor, or other sensor), but that is different from the sensor that is used by the primary vehicle control system to determine lateral velocity during normal operation of the primary vehicle control system.

Likewise, it will be appreciated that some or all of the other hardware utilized by a primary or secondary vehicle control system may be utilized for both control systems. For example, in some implementations the primary and secondary vehicle control systems may share one or more processors, memories, mass storage devices, network interfaces, housings, power supplies, software, etc. In one example implementation, for example, primary and secondary vehicle control systems may be executed on the same processors, with the secondary vehicle control system configured within lower level software capable of implementing a controlled stop in response to detected unresponsiveness by a higher level primary vehicle control system. In other implementations, the primary and secondary vehicle control systems may execute on different processors but share other hardware components. Therefore, the invention is not limited to the particular configuration of primary and secondary vehicle control systems 120, 160 illustrated in FIG. 1.

Figure 2:
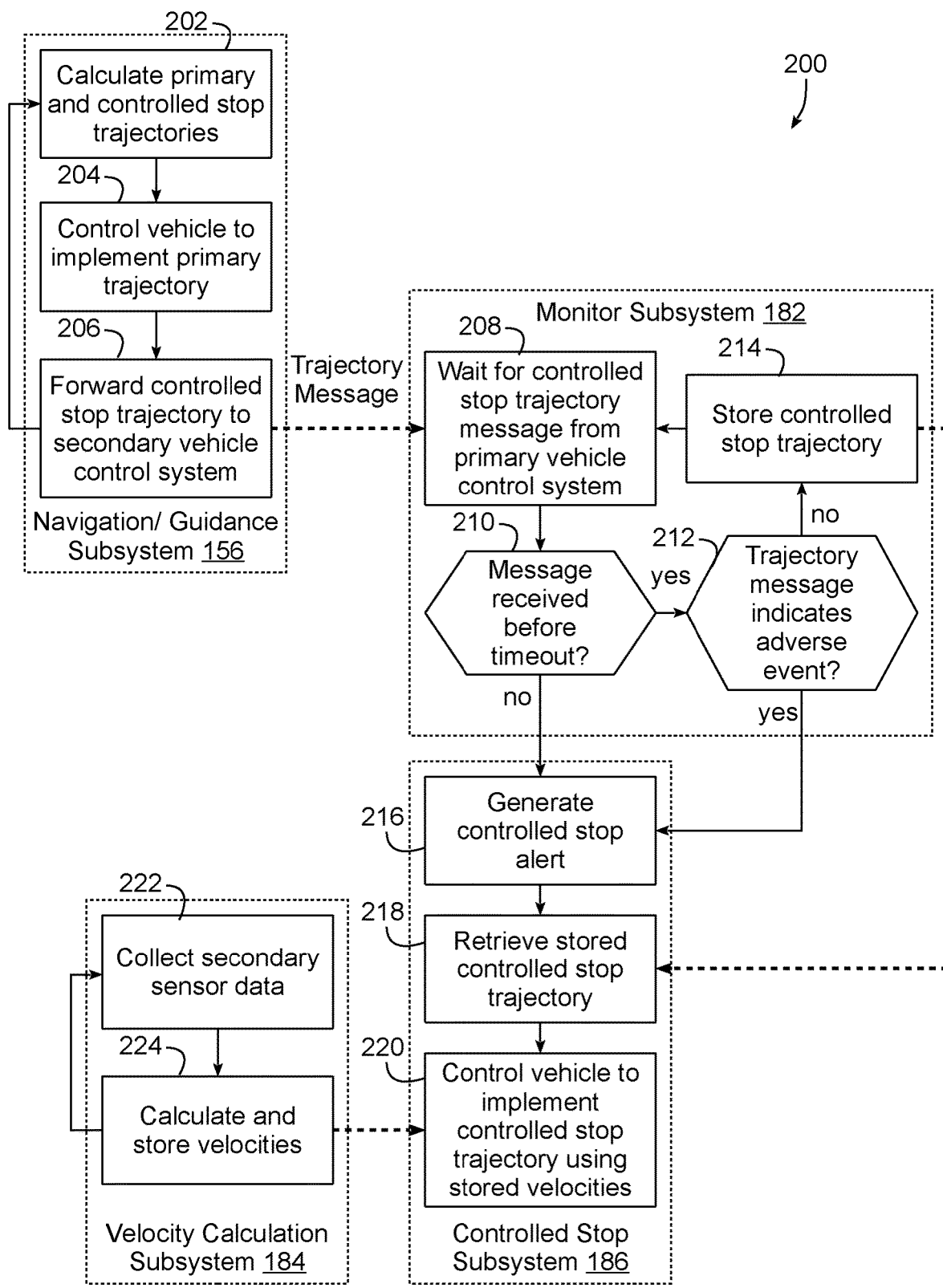
FIG. 2 is a flowchart illustrating an example sequence of operations for controlling the autonomous vehicle of FIG. 1.

Now turning to FIG. 2, this figure illustrates an example sequence of operations 200 for use in controlling a vehicle using the primary and secondary vehicle control systems 120, 160 of FIG. 1. Blocks 202-206, for example, illustrate at a very high level an iterative loop representing the operation of navigation/guidance subsystem 156 of primary vehicle control system 120. In block 202, navigation/guidance subsystem 156 determines primary and controlled stop trajectories for the vehicle. The primary trajectory represents the desired path of the vehicle over a relatively brief time period, taking into account, for example, the desired destination and route of the vehicle, the immediate surroundings of the vehicle, and any obstacles or other objects in the immediate surroundings, and it is this trajectory that the primary vehicle control system uses to control the vehicle in block 204.

The controlled stop trajectory, in contrast, represents an alternate trajectory for the vehicle that may be undertaken in response to an adverse event in the primary vehicle control system. Depending upon the surroundings, the controlled stop trajectory may, for example, direct the vehicle onto the shoulder of a highway, into the parking lane of a city street, or to another area outside of regular traffic flow. Alternatively, the controlled trajectory may bring the vehicle to a stop while continuing in the same lane or path as the primary trajectory.

It will be appreciated that blocks 202 and 204 may be implemented in a wide variety of manners in various implementations, and that implementing the controlled stop functionality described herein in connection with those different manners would be well within the abilities of those of ordinary skill having the benefit of the instant disclosure.

Block 206 periodically communicates the determined controlled stop trajectory to monitor subsystem 182 of secondary vehicle control system 160. In the illustrated implementation, the trajectory is communicated via a trajectory message that additionally functions as a heartbeat message from primary vehicle control system 120. Additional information may also be communicated in a trajectory message, e.g., the occurrence of any adverse events, a timestamp, or any other information that may be useful for secondary vehicle control system. In other implementations, a trajectory may be stored in a shared memory, while other implementations may utilize other manners to make a determined trajectory available for access by the secondary vehicle control system.

Thus, primary vehicle control system 120 may continuously update a controlled stop trajectory for the vehicle based upon the vehicle's current surroundings and status, and provide regular updates to the secondary vehicle control system such that the secondary vehicle control system may assume control and implement a controlled stop operation in the event of an adverse event. Consequently, primary vehicle control system 120 may adjust a controlled stop trajectory depending upon vehicle conditions, e.g., to change the controlled stop trajectory when a pedestrian or another vehicle is a parking lane or highway shoulder.

It will be appreciated that in many instances determining a vehicle trajectory based upon a vehicle's current surroundings is generally a computationally intensive operation that relies on large volumes of data from various complex sensors. Thus, by determining the controlled stop trajectory in the primary vehicle control system, the computational resources and sensors that may be required for trajectory determination may be omitted from a secondary vehicle control system in some implementations. In other implementations, however, a controlled stop trajectory may be determined in the secondary vehicle control system, and such functionality may be omitted from primary vehicle control system 120.

Monitor subsystem 182 of secondary vehicle control system 160 iterates between blocks 208-214. In block 208, monitor subsystem 182 waits for a next trajectory message from the primary vehicle control system. In addition, a watchdog timer runs to ensure that trajectory messages are received within a required interval, as the failure to receive a trajectory message within an interval may be indicative of an adverse event in the primary vehicle control system. Upon receipt of a message, or after expiration of the watchdog timer without receiving a message, control passes to block 210 to determine if a message was received. If so, control passes to block 212 to determine if the received message includes any indication of an adverse event requiring that the secondary vehicle control system assume control of the vehicle to initiate a controlled stop. If not, control passes to block 214 to store the updated controlled stop trajectory provided in the message, and control returns to block 208 to start the watchdog timer and wait for the next trajectory message. Thus, during normal operation of primary vehicle control system 120, monitor subsystem 182 maintains an up to date controlled stop trajectory for use if an adverse event ever occurs.

If, however, an adverse event is detected, either as a result of a failure to receive a trajectory message within the required interval, or as a result of an adverse event being signaled in the trajectory message, blocks 210 and 212 will instead notify controlled stop subsystem 186 of the need to initiate a controlled stop of the vehicle. In block 216, subsystem 186 may optionally generate a controlled stop alert, e.g., by displaying information on a vehicle display, generating audible and/or visual alerts, or otherwise indicating that a controlled stop operation is being initiated. In other implementations, however, no alert may be generated.

Block 218 next retrieves the last-stored controlled stop trajectory, and block 220 then implements that trajectory while monitoring the velocity of the vehicle. The velocity in the illustrated implementation is based upon longitudinal and lateral velocities determined by velocity calculation subsystem 184. In the illustrated implementation, velocity calculation subsystem 184 executes a loop with blocks 222 and 224, with block 222 collecting sensor data from one or more secondary sensors and block 224 calculating and storing both longitudinal and lateral velocity from the collected sensor data. The stored velocities are then retrieved by block 220 of controlled stop subsystem 186 and used to implement the controlled stop operation.

It will be appreciated that implementation of a controlled stop operation to follow a controlled stop trajectory based on sensed longitudinal and lateral velocities of the vehicle is well within the abilities of those of ordinary skill having the benefit of the instant disclosure. Additional sensors may also be used in connection with implementing a controlled stop, however, so the invention is not limited to implementing a controlled stop solely based on sensed velocity.

Figure 3:
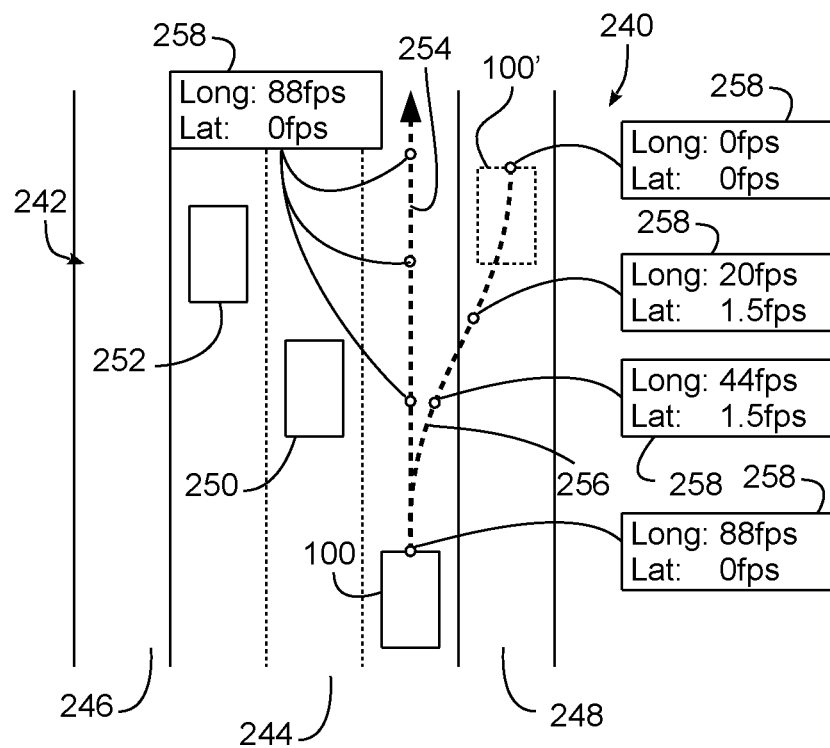
FIG. 3 is a functional view of an example scene, illustrating example primary and controlled stop trajectories generated for the autonomous vehicle of FIG. 1.

FIG. 3, for example, illustrates an example scene 240 where autonomous vehicle 100 is traveling along a three lane highway 242, e.g., within a right-most lane 244. Highway 242 additionally includes opposing shoulders 246, 248, and additional vehicles 250, 252 may also be in the vicinity of autonomous vehicle 100 and traveling in the same direction. In this scene, primary vehicle control system 120 may continuously update a primary trajectory 254 as well as a controlled stop trajectory 256, such that if no adverse event has been detected, primary vehicle control system 120 controls vehicle 100 to follow primary trajectory 254 while if an adverse event is detected, a controlled stop operation is performed to control vehicle 100 to follow controlled stop trajectory 256. For each trajectory 254, 256, a subset of the control points are illustrated at 258. Thus, for primary trajectory 254, primary vehicle control system 120 may define a substantially straight having a substantially constant longitudinal velocity of about 88 feet per second (fps) and a lateral velocity of about 0 fps. On the other hand, due to the closer proximity of shoulder 248 to lane 244, as well as the presence of vehicles 250, 252, primary vehicle control system 120 may define a path for controlled stop trajectory 256 that smoothly decelerates vehicle 100 while directing vehicle 100 into shoulder 248 to come to rest at the position illustrated at 100'. In each case, the respect vehicle control system 120, 160 may control direction control 112, powertrain control 114 and brake control 116 to appropriate match the velocities defined by the respective trajectories 254, 256.

Returning to FIG. 1, various types of sensors may be used as an additional sensor from which to determine a redundant lateral velocity for use in controlling a vehicle to implement a controlled stop. For example, an optical sensor, e.g., array sensor 176 (discussed in greater detail below), or even a non-array optical sensor, may be used to capture images of a ground or driving surface and through image analysis detect movement of the vehicle relative thereto. Alternatively, in some implementations, a RADAR sensor, e.g., similar to RADAR sensor 134 in primary vehicle control system 120, may be used as an additional sensor. In some implementations, a RADAR sensor may be a short range Doppler sensor and/or a ground penetrating RADAR sensor.

In some implementations, an optical or RADAR sensor may be oriented at a non-orthogonal angle relative to vertical and in a direction generally parallel to a lateral axis of the vehicle in order to measure lateral velocity along the lateral axis. In some instances, such a sensor may be disposed on the undercarriage of the vehicle, although the invention is not so limited, as other locations and orientations that enable velocity to be measured generally along the lateral axis of the vehicle may be used. In some instances, an optical or RADAR sensor may be exclusive to the secondary vehicle control system, and in other instances may be shared by the primary and secondary vehicle control systems.

Other sensors capable of sensing or otherwise estimating lateral velocity may also be used. For example, LIDAR sensors, radar sensors, sonar sensors, mechanical contact (caster) sensors, etc. may also be used in other implementations. Further, as noted above, such sensors may be exclusive to a secondary vehicle control system or shared between primary and secondary vehicle control systems in different implementations.

Other variations will be appreciated by those of ordinary skill having the benefit of the instant disclosure.

Downwardly-Directed Optical Array Sensor

As noted above, in some implementations, an additional sensor used to generate a lateral velocity for use in performing controlled stops may include one or more downwardly-directed optical sensors configured to capture images of a ground or driving surface to sense movement of the vehicle relative to the driving surface. In such implementations, a plurality of images of the ground surface may be captured from the one or more optical sensors, and the plurality of images may be processed to determine the lateral velocity of the vehicle.

Figure 4:
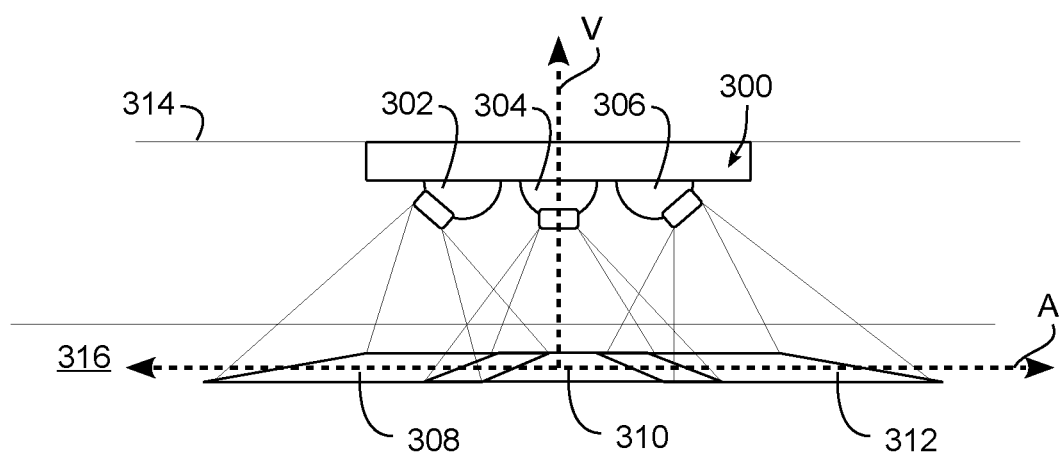
FIG. 4 is a functional side elevation view of a one-dimensional optical array sensor suitable for use in the autonomous vehicle of FIG. 1.
Figure 5:
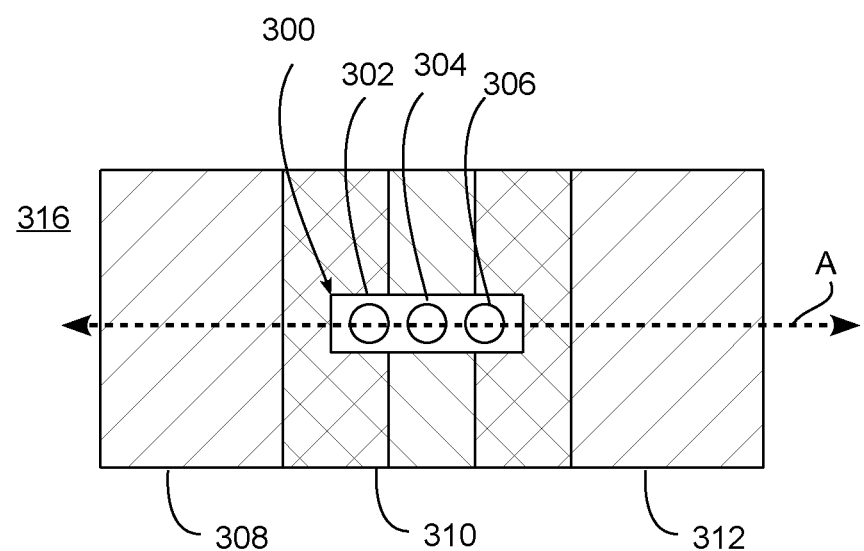
FIG. 5 is a functional top plan view of the optical array sensor of FIG. 4.

In some implementations, the optical sensors may form an optical array sensor, e.g., optical array sensor 176 of FIG. 1, with individual optical sensors arranged to have different, positionally offset, fields of view. For example, FIGS. 4-5 illustrate one example implementation of an optical array sensor 300 including three optical sensors 302, 304, 306 having respective fields of view 308, 310, 312 arranged generally along an axis A, which may correspond generally to a longitudinal axis of a vehicle, the underside of which is illustrated at 314. Fields of view 308, 310 cover a portion of a ground or driving surface 316, and it will be appreciated that each optical sensor 302, 304, 306 is downwardly-directed, with optical sensor 304 generally facing along a vertical axis V relative to ground surface 316, and optical sensors 302 and 306 generally facing at an angle relative to the vertical axis.

Each optical sensor 302, 304, 306 may incorporate various types of electromagnetic radiation sensors capable of capturing an image of the ground surface such that images captured at different times may be correlated with one another to determine a positional displacement of the vehicle relative to the ground surface between those different times. For example, an optical sensor may incorporate an image capture device such as used in a digital camera. In addition, an optical sensor may be sensitive to different ranges of electromagnetic frequencies, e.g., within the visible light spectrum, below the visible light spectrum (e.g., infrared frequencies) and/or above the visible light spectrum (e.g., x-ray or ultraviolet frequencies). Other types of optical sensors suitable for capturing images of the ground surface may be used in other implementations.

As illustrated in FIGS. 4-5, in some implementations, the fields of view 302, 304, 306 may be overlapping with one another to aid in correlating the images from optical sensors 302, 304, 306. By aligning these fields of view generally along the longitudinal axis A, images captured from different optical sensors 302, 304, 306 may be correlated at different velocities in order to determine positional displacement of vehicle 314 over a time range, from which a vehicle velocity may be calculated. At lower speeds, for example, two images captured by the same optical sensor 302, 304, 306 may be correlated to determine a velocity, while at higher speeds the vehicle may have traveled too far for the same section of ground surface to be detected in two images from the same optical sensor 302, 304, 306, such that images of the same section of ground surface 316 captured at two different times from two positionally separated optical sensors 302, 304, 306 may be correlated in order to determine the positional displacement of the vehicle.

Further, in some implementations, images from multiple optical sensors 302, 304, 306 may be stitched together into composite images to provide the greater effective aperture, thereby facilitating correlating the position of the vehicle relative to the ground surface for the purposes of velocity calculations.

Correlation of different images, in this regard, may be considered to refer to an operation by which two images capturing overlapping views of the same section of ground surface may be aligned with one another. Various image processing techniques that shift and/or distort one or more images to find a positional displacement between the images may be used to perform a correlation. Where images being correlated are captured at different times, the correlation may be used to determine a positional displacement of the vehicle relative to the ground surface between the two points in time. When images being correlated are captured at the same time, the correlation may be used to stitch the images together into a single composite image. In many instances, the correlation relies on matching shapes or other distinctive features in the images, as will be appreciated by those of ordinary skill having the benefit of the instant disclosure.

Figure 6A:
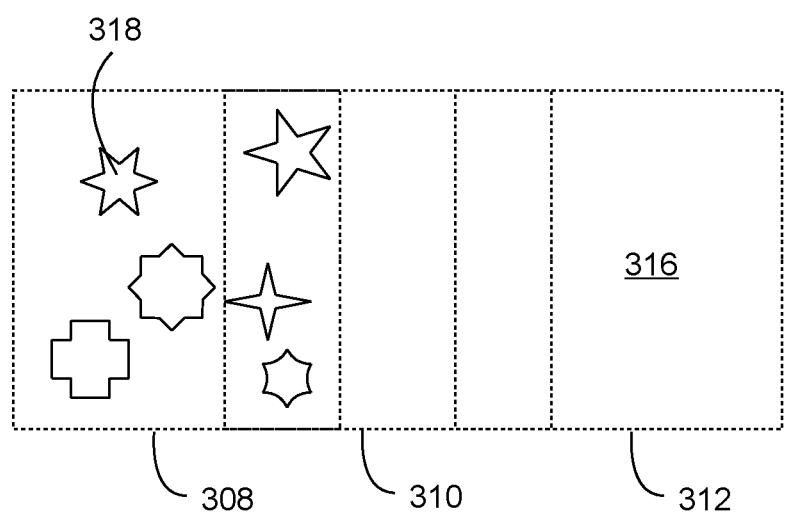
FIGS. 6A-6D functionally illustrate detection of vehicle movement by the optical array sensor of FIGS. 4-5 between two points in time, with FIG. 6A functionally illustrating the position of the vehicle at a first time, and with FIGS. 6B, 6C, and 6D illustrating the position of the vehicle at a second time, but traveling at three different speeds.

FIGS. 6A-6D, for example, illustrate example scenarios whereby images captured by different optical sensors 302, 304, 306 may be correlated at different vehicle velocities. FIG. 6A, in particular, illustrates fields of view 308, 310, 312 of optical sensors 302, 304, 306 relative to ground surface 316 at a first time $t_0$. To facilitate the discussion, a set of distinctive features 318 is illustrated on ground surface 316, it being understood that such shapes would ordinarily not be found on a typical driving surface.

Figure 6B:
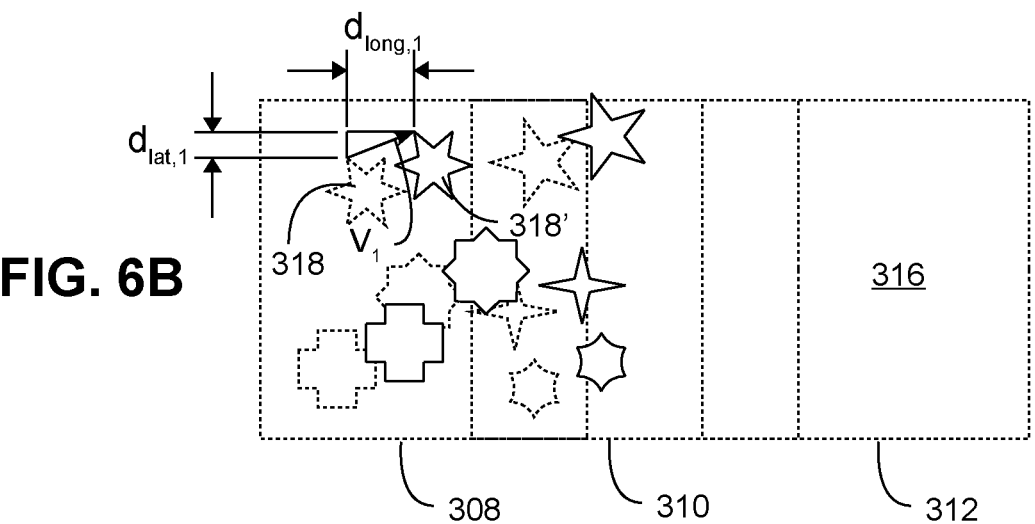
Figure 6C:
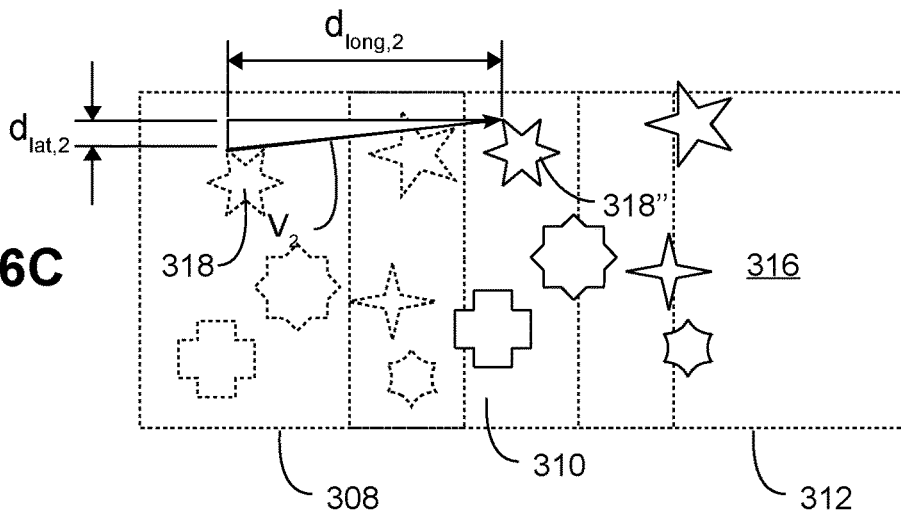
Figure 6D:
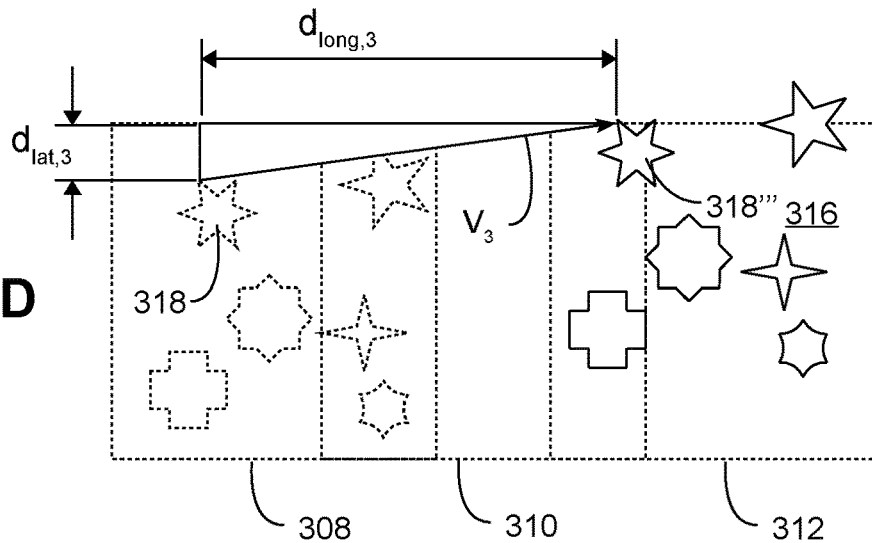

FIGS. 6B-6D respectively illustrate fields of view 308, 310, 312 of optical sensors 302, 304, 306 relative to ground surface 316 at a second time $t_1$, but assuming that vehicle 314 is traveling at three different speeds. FIG. 6B, for example, illustrates vehicle 314 movement at a relatively low speed, such that distinctive features 318 have moved to the position illustrated at 318', resulting in a positional displacement represented by vector $V_1$. Vector $V_1$ has a direction and a magnitude, and the longitudinal and lateral components of vector $V_1$ have magnitudes or distances representing longitudinal position displacement $d_{long,1}$ and lateral position displacement $d_{lat,1}$ between times $t_0$ and $t_1$. The longitudinal and lateral velocities $V_{long}$ and $V_{lat}$ may be calculated from these displacements as follows:

$$V_{long}=d_{long,1}/(t_1-t_0) \quad (1)$$

$$V_{lat}=d_{lat,1}/(t_1-t_0) \quad (2)$$

Moreover, it will be appreciated that based upon the magnitude of positional displacement illustrated in FIG. 6B, the images captured by optical sensor 302 at times $t_0$ and $t_1$ and represented by field of view 308 may be used to determine the positional displacement between these times.

At a higher speed, e.g., as illustrated in FIG. 6C, vehicle 314 movement at the relatively higher speed results in distinctive features 318 moving to the position illustrated at 318", and having a positional displacement represented by vector $V_2$. Vector $V_2$ has a direction and a magnitude, and the longitudinal and lateral components of vector $V_2$ have magnitudes or distances representing longitudinal position displacement $d_{long,2}$ and lateral position displacement $d_{lat,2}$ between times $t_0$ and $t_1$. Based upon the magnitude of positional displacement illustrated in FIG. 6C, the image captured by optical sensor 304 at time $t_1$ (represented by field of view 310) may be correlated with the image captured by optical sensor 302 at time $t_0$ (represented by field of view 308) for the purpose of determining the positional displacement between these times.

Likewise, at an even higher speed, e.g., as illustrated in FIG. 6D, vehicle 314 movement at the relatively even higher speed results in distinctive features 318 moving to the position illustrated at 318''', and having a positional displacement represented by vector $V_3$. Vector $V_3$ has a direction and a magnitude, and the longitudinal and lateral components of vector $V_3$ have magnitudes or distances representing longitudinal position displacement $d_{long,3}$ and lateral position displacement $d_{lat,3}$ between times $t_0$ and $t_1$. Based upon the magnitude of positional displacement illustrated in FIG. 6D, the image captured by optical sensor 306 at time $t_1$ (represented by field of view 312) may be correlated with the image captured by optical sensor 302 at time to (represented by field of view 308) for the purpose of determining the positional displacement between these times.

It will be appreciated that by incorporating multiple downwardly-directed optical sensors having positionally offset fields of view, the collective field of view of an optical array sensor may be larger than that of any of the individual sensors, and may provide a larger effective aperture for the optical array sensor that enables velocity to be captured over a larger range and potentially using lower frame rates. Moreover, by aligning multiple fields of view generally along a longitudinal axis of a vehicle, an optical array sensor may be particularly well suited for applications where a high aspect ratio exists between longitudinal and lateral velocity, as is the case with an autonomous vehicle that may be expected to travel up to 60-100 mph or more, but with lateral velocities that are significantly smaller, even when executing turns.

Figure 7:
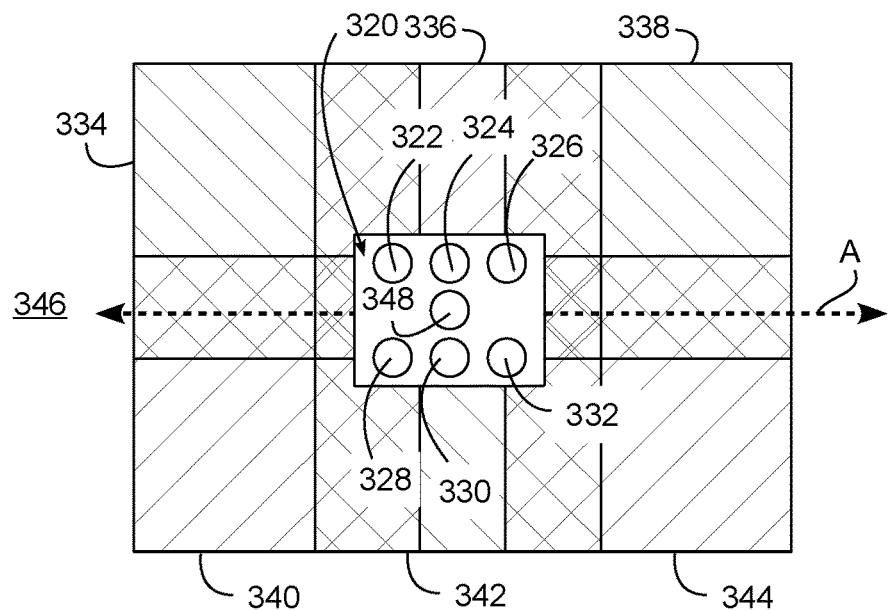
FIG. 7 is a functional top plan view of a two-dimensional optical array sensor suitable for use in the autonomous vehicle of FIG. 1.

While optical array sensor 300 is illustrated having three optical sensors 302, 304, 306 oriented along a one dimensional array, the invention is not so limited. In particular, greater or fewer optical sensors may be arranged into an array, and moreover, arrays may be defined in two dimensions. FIG. 7, for example, illustrates a 2×3 optical array sensor 320 including six optical sensors 322, 324, 326, 328, 330, 332 having respective fields of view 334, 336, 338, 340, 342, 344 disposed in a 2×3 array covering a portion of ground surface 346. Moreover, in some implementations, it may be desirable to incorporate one or more strobe emitters, e.g., a flash or strobe emitter 348, which can illuminate the ground surface 346 in connection with capturing images with optical sensors 322-332 to enable shorter exposure times and reduced image blurring, and thereby facilitate image correlation.

Furthermore, it will be appreciated that optical array sensors in some implementations need not have fields of view that are precisely arranged along regularly spaced intervals along one or two dimensions. For example, the fields of view of multiple optical sensors in one dimension may have different spacings along an axis of the one dimension, and moreover, may be laterally offset from one another along a transverse direction from that axis. Likewise, the fields of view of multiple optical sensors in a two dimensional array may be separated from one another by different spacings.

Moreover, while optical array sensor 300 is illustrated having a single housing for optical sensors 302-306, in other implementations the optical sensors of an optical array sensor may have separate housings and may be separately mounted to a vehicle. Further, while optical array sensor 300 is illustrated as being mounted to the undercarriage of a vehicle, it will be appreciated that other mounting locations from which the ground surface may be imaged may be used in other implementations. As such, various combinations and orientations of downwardly-directed optical sensors may be used for an optical array sensor in different implementations.

Further, an optical array sensor 300 may also include additional sensors for calibration purposes. For example, one or more distance sensors, e.g., laser rangefinders, may be used to sense the distance of optical array sensor 300 from the ground surface, such that the images collected therefrom and the positional displacements calculated therefrom may be appropriately scaled to compensate for a differing distance between the optical sensor and the ground surface.

Figure 8:
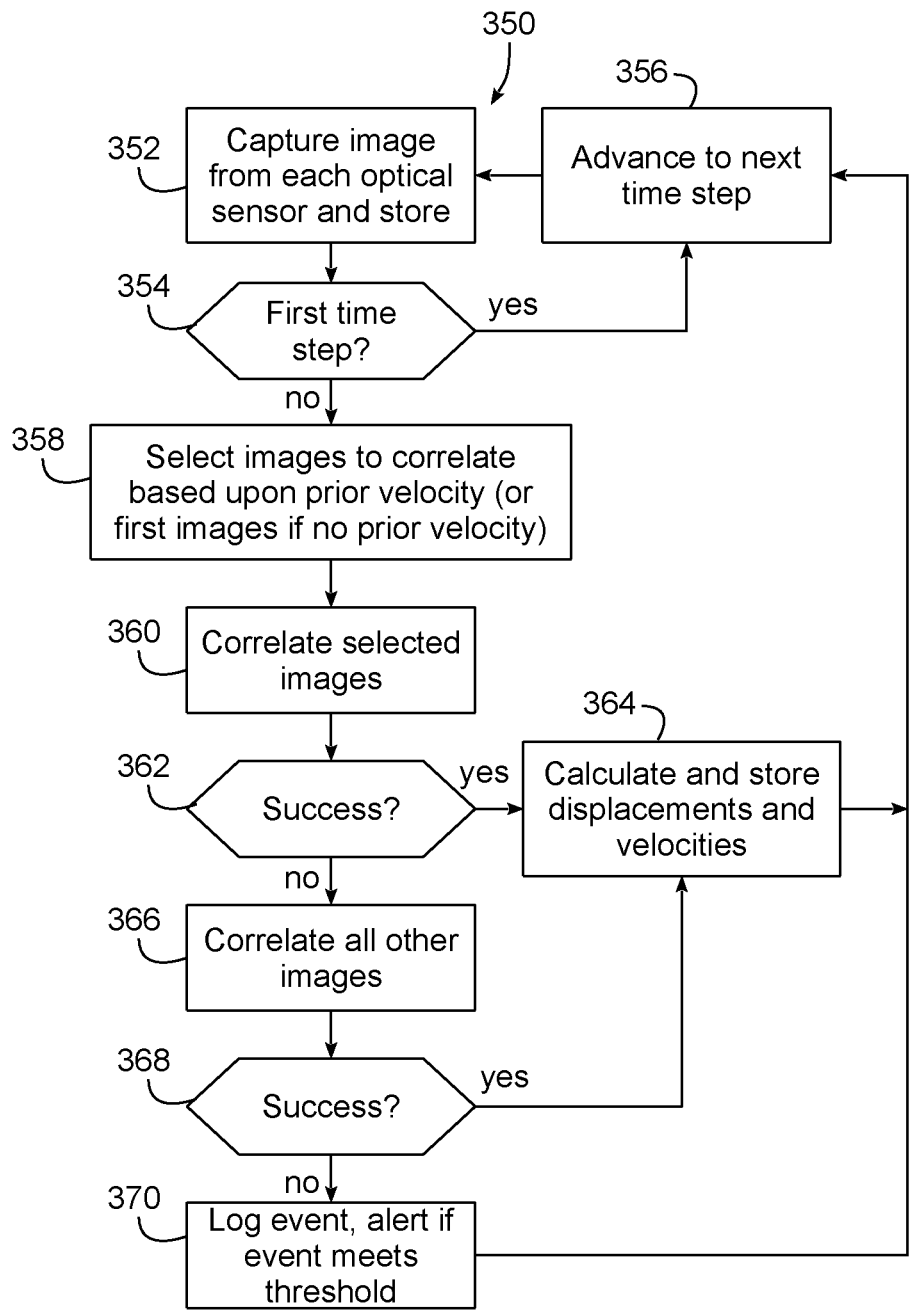
FIG. 8 is a flowchart illustrating an example sequence of operations for sensing velocity with the optical array sensor of FIGS. 4-5.

Now turning to FIG. 8, this figure illustrates an example sequence of operations 350 for sensing velocity using optical array sensor 300 of FIGS. 4-5. Sequence of operations 350 may be implemented, for example, within a processor or controller of optical array sensor 300, or alternatively, within a processor or controller that is external to sensor 300, e.g., within secondary vehicle control system 160 of FIG. 1. Sequence of operations 350 is configured to sense velocity between successive time steps, which may, in some implementations, be equivalent to a control cycle of a vehicle control system, or alternatively, may be shorter or longer in duration relative thereto. For example, the collection rate of an optical array sensor in some implementations may be faster than the control cycle rate for a vehicle control system such that multiple velocities can be sensed and calculated, and in some instances, averaged together, within a single control cycle. It is assumed for the purposes of this example that optical sensor 302 having field of view 308 captures "first" images, while optical sensor 304 having field of view 310 captures "second" images and optical sensor 306 having field of view 312 captures "third" images to represent the relative positional offsets of fields of view 308, 310 and 312 along the longitudinal axis of the vehicle.

The sequence begins in block 352 by capturing an image with each optical sensor (e.g., image capture device) of optical array sensor 300, and storing the image, e.g., along with a corresponding timestamp. Control then passes to block 354 to determine whether this is the first time step, and if so, passes control to block 356 to advance to the next time step. Thus, on second and subsequent time steps, block 354 passes control to block 358 to select pairs of images to correlate based upon a prior velocity determination.

It will be appreciated that in many instances the maximum rate of change in velocity of a vehicle in normal operation will be relatively slow as compared to the velocity collection rate of optical array sensor 300, and as such, in some implementations it may be desirable to reduce the processing overhead associated with correlating images by attempting to predict which images will likely be correlatable with one another given the current velocity of the vehicle and the known positional offsets of the fields of view 308, 310, 312. This prediction may be based in some implementations upon storing velocity information from the prior time step (e.g., the prior longitudinal velocity or displacement) and selecting an image based on a mapping of velocity or displacement ranges to fields of view 308, 310, 312. In other implementations, the prediction may be based upon storing an indication of which images were correlated in the prior time step, and reusing those images for the current time step. In still other implementations, however, prediction of which images to correlate may be omitted, e.g., such that all images are sequentially or concurrently correlated with one another.

In addition, if no prior velocity determination has been made (e.g., on the second time step), the first images captured by optical sensor 302 at the current and prior time step may be selected for correlation in block 358, as it may be assumed that upon startup the vehicle is expected to not be moving.

Thus, based upon the images selected in block 358, block 360 attempts to correlate the images captured at the current and prior time steps, e.g., using image processing to detect a positional offset between distinctive features in the respective images. Block 362 determines whether the correlation was successful, and if so, passes control to block 364 to calculate and store the aforementioned lateral and/or longitudinal displacements and/or velocities in the manner described above. Control then returns to block 354 to advance to the next time step.

If not, however, the prediction was unsuccessful, and block 362 passes control to block 366 to attempt to correlate all images. Thus, for example, for optical array sensor 300, the image captured by optical sensor 302 at the prior time step may be correlated with the images captured by each of optical sensors 302, 304, 306 at the current time step, the image captured by optical sensor 304 at the prior time step may be correlated with the images captured by each of optical sensors 302, 304, 306 at the current time step, and the image captured by optical sensor 306 at the prior time step may be correlated with the images captured by each of optical sensors 302, 304, 306 at the current time step.

Next, block 368 determines whether any of the correlations were successful, i.e., whether any pair of images could be mapped. If so, control passes to block 364 to calculate and store the aforementioned lateral and/or longitudinal displacements and/or velocities in the manner described above based upon the images that were successfully correlated.

If not, however, block 368 passes control to block 370 to optionally log an event indicating that no correlation could be found. Doing so, for example, may enable subsequent time steps to ignore the current time step and correlate between images spanning multiple prior time steps. Doing so may also enable more systemic errors to be detected, e.g., due to failures in sensor hardware, optical sensors being blocked or overly-soiled, etc. As such, block 370 may also signal an alert in some instances, e.g., after N successive time steps without a successful correlation. Block 370 then returns to block 354 to continue to the next time step.

Figure 9:
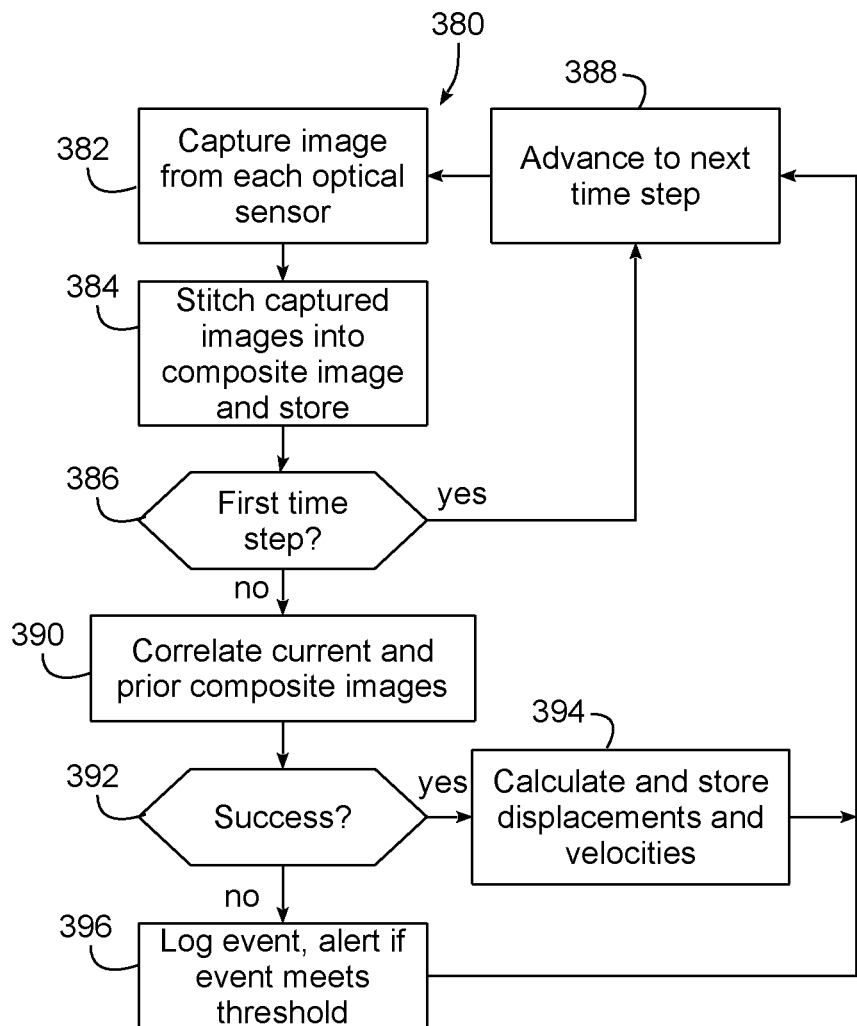
FIG. 9 is a flowchart illustrating another example sequence of operations for sensing velocity with the optical array sensor of FIGS. 4-5.

Sequence of operations 350 therefore attempts to match different images collected at different points in time by different optical sensors in order to determine a positional displacement of the vehicle over those points in time, and from which at least lateral velocity may be determined. However, other sequences of operations may be used in other implementations. FIG. 9, for example, illustrates an alternative sequence of operations 380 that generates composite images from the images of multiple optical sensors and performs a correlation between the composite images at different points in time. Block 382, for example, captures images from each of optical sensors 302-306, and block 384 stitches the images into a single composite image. Block 384, for example, may perform a correlation between each of the images to shift and/or distort each of the images such that the overlapping fields of view align with one another, resulting in a composite image covering all of the fields of view. Block 384 may also store the composite image along with a timestamp associated with the time at which the image was captured.

Next, block 386 determines if this is the first time step, and if so, passes control to block 388 to advance to the next time step. Thus, on second and subsequent time steps, block 386 passes control to block 390 to attempt to correlate the current composite image with a prior composite image (e.g., the composite image for the immediately prior time step), e.g., using image processing to detect a positional offset between distinctive features in the respective composite images. Block 392 determines whether the correlation was successful, and if so, passes control to block 394 to calculate and store the aforementioned lateral and/or longitudinal displacements and/or velocities in the manner described above. Control then returns to block 388 to advance to the next time step.

If not, however, block 392 passes control to block 396 to optionally log an event indicating that no correlation could be found. Doing so, for example, may enable subsequent time steps to ignore the current time step and correlate between images spanning multiple prior time steps. Doing so may also enable more systemic errors to be detected, e.g., due to failures in sensor hardware, optical sensors being blocked or overly-soiled, etc. As such, block 396 may also signal an alert in some instances, e.g., after N successive time steps without a successful correlation. Block 396 then returns to block 388 to continue to the next time step.

Optical array sensors of the type disclosed herein may be used, for example, to determine one or more velocities associated with vehicle movement, including, for example, direction and/or magnitude components of an overall velocity of a vehicle and/or magnitudes of velocity along one or more predetermined directions (e.g., lateral velocities and/or longitudinal velocities respectively along lateral and longitudinal axes of a vehicle). Moreover, in addition to or in lieu of storing one or more velocities, an optical array sensor may also communicate, send, or otherwise output the determined displacements and/or velocities to an external device such as a vehicle control system. Furthermore, while an optical array sensor is disclosed herein as being used by a secondary vehicle control system, the invention is not so limited. In particular, in some implementations an optical array sensor as disclosed herein may be used by a primary vehicle control system, or even in implementations where no secondary vehicle control system is used.

In addition, while optical array sensors as disclosed herein provide an increased effective aperture that enables images captured at a particular sampling rate to cover a wider range of velocities, in some implementations the sampling rate may be dynamically adjustable to cover an even wider range of velocities. Further, in some implementations multiple optical sensors may have comparable fields of views to provide additional redundancy.

Other variations will be apparent to those of ordinary skill. Therefore, the invention lies in the claims hereinafter appended.

What is claimed is:

1. A method of autonomously operating a vehicle, comprising:
   receiving a plurality of images of a ground surface captured from a plurality of downwardly-directed optical sensors mounted to the vehicle, each of the plurality of downwardly-directed optical sensors having a respective field of view, and the plurality of downwardly-directed optical sensors arranged such that the respective fields of view differ from one another, wherein at least a subset of the plurality of downwardly-directed optical sensors are arranged to have respective fields of view that are positionally offset along a one-dimensional array, and wherein the subset of downwardly-directed optical sensors arranged to have respective fields of view that are positionally offset along the one-dimensional array includes first and second downwardly-directed optical sensors;

processing the plurality of images using at least one processor to determine a velocity of the vehicle, including:

correlating a first image captured at a first time by the first downwardly-directed optical sensor with a second image captured at a second time by the second downwardly-directed optical sensor to determine a positional displacement of the vehicle between the first and second times; and determining the velocity based upon the determined positional displacement of the vehicle between the first and second times; and autonomously controlling movement of the vehicle using the determined velocity.

2. The method of claim 1, wherein at least a subset of the plurality of downwardly-directed optical sensors are arranged to have respective fields of view that are positionally offset in a two-dimensional array.

3. The method of claim 1, wherein the one-dimensional array extends generally along a longitudinal axis of the vehicle.

4. The method of claim 1, wherein the respective fields of view of at least a subset of the plurality of downwardly-directed optical sensors partially overlap with one another.

5. The method of claim 1, wherein processing the plurality of images includes:

correlating third and fourth images respectively captured at third and fourth times by a third downwardly-directed optical sensor among the plurality of downwardly-directed optical sensors to determine a positional displacement of the vehicle between the third and fourth times; and determining a second velocity based upon the determined positional displacement of the vehicle between the third and fourth times.

6. The method of claim 1, wherein correlating the first image captured at the first time by the first downwardly-directed optical sensor with the second image captured at a second time by the second downwardly-directed optical sensor is a first correlation, and wherein processing the plurality of images further includes:

performing a second correlation between the first image captured at the first time by the first downwardly-directed optical sensor and a third image captured at a third time by the first downwardly-directed optical sensor; and using one of the first and second correlations to determine the positional displacement of the vehicle between the first time and one of the second and third times.

7. The method of claim 6, wherein the second and third times are substantially the same.

8. The method of claim 6, wherein using the one of the first and second correlations to determine the positional displacement includes:

using the first correlation in response to determining that the second image could be correlated to the first image; and using the second correlation in response to determining that the third image could be correlated to the first image.

9. The method of claim 1, wherein the subset of downwardly-directed optical sensors arranged to have respective fields of view that are positionally offset along the one-dimensional array includes more than two downwardly-directed optical sensors.

10. The method of claim 1, wherein the one-dimensional array extends generally along a longitudinal axis of the vehicle, and wherein the subset of downwardly-directed optical sensors arranged to have respective fields of view that are positionally offset along the one-dimensional array collectively provide an effective aperture that is larger along the longitudinal axis of the vehicle than along a lateral axis of the vehicle.

11. The method of claim 1, wherein the plurality of images includes images captured at a plurality of times by each of the subset of downwardly-directed optical sensors.

12. The method of claim 11, wherein processing the plurality of images includes:

stitching together multiple images from each of the plurality of times to generate a composite image for each of the plurality of times;

correlating a first composite image for a third time among the plurality of times with a second composite image for a fourth time among the plurality of times to determine a positional displacement of the vehicle between the third and fourth times; and determining the a second velocity based upon the determined positional displacement of the vehicle between the third and fourth times.

13. The method of claim 12, wherein the respective fields of view of the subset of downwardly-directed optical sensors partially overlap with one another, and wherein stitching together the multiple images from each of the plurality of times includes correlating overlapping regions of the multiple images.

14. The method of claim 11, wherein the plurality of times are within a single control cycle among a plurality of control cycles.

15. The method of claim 1, wherein the plurality of downwardly-directed optical sensors are coupled to a primary vehicle control system of the vehicle, wherein the primary vehicle control system includes the at least one processor, and wherein receiving the plurality of images, processing the plurality of images, and autonomously controlling movement of the vehicle are performed by the primary vehicle control system.

16. The method of claim 1, wherein the plurality of downwardly-directed optical sensors are coupled to a secondary vehicle control system of the vehicle, wherein the secondary vehicle control system includes the at least one processor, and wherein receiving the plurality of images, processing the plurality of images, and autonomously controlling movement of the vehicle are performed by the second vehicle control system subsequent to detection of an adverse event for a primary vehicle control system of the vehicle.

17. The method of claim 1, wherein the plurality of downwardly-directed optical sensors are disposed on an undercarriage of the vehicle.

18. The method of claim 1, wherein determining the velocity includes determining a lateral velocity of the vehicle.

19. The method of claim 1, wherein determining the velocity includes determining a longitudinal velocity of the vehicle.

20. The method of claim 1, wherein determining the velocity includes determining a magnitude component and a direction component of the velocity.

21. The method of claim 1, wherein the vehicle comprises a fully autonomous vehicle.

22. The method of claim 1, wherein the vehicle comprises an autonomous wheeled vehicle.

23. The method of claim 1, wherein the vehicle comprises an autonomous automobile, bus or truck.

24. The method of claim 1, wherein the plurality of downwardly-directed optical sensors are infrared sensors.

25. The method of claim 1, further comprising:
   capturing the plurality of images with the plurality of downwardly-directed optical sensors; and
   illuminating the ground surface with a strobe emitter when capturing the plurality of images.

26. A vehicle control system, comprising:
   a plurality of downwardly-directed optical sensors configured to be mounted to a vehicle to capture images of a ground surface, each of the plurality of downwardly-directed optical sensors having a respective field of view, and the plurality of downwardly-directed optical sensors arranged such that the respective fields of view differ from one another, wherein at least a subset of the plurality of downwardly-directed optical sensors are arranged to have respective fields of view that are positionally offset along a one-dimensional array, and wherein the subset of downwardly-directed optical sensors arranged to have respective fields of view that are positionally offset along the one-dimensional array includes first and second downwardly-directed optical sensors; and
   at least one processor coupled to the plurality of downwardly-directed optical sensors, the at least one processor configured to receive a plurality of images of the ground surface captured from the plurality of downwardly-directed optical sensors, process the plurality of images to determine a velocity of the vehicle, and autonomously control movement of the vehicle using the determined velocity, wherein the at least one processor is configured to process the plurality of images by correlating a first image captured at a first time by the first downwardly-directed optical sensor with a second image captured at a second time by the second downwardly-directed optical sensor to determine a positional displacement of the vehicle between the first and second times and determining the velocity based upon the determined positional displacement of the vehicle between the first and second times.

27. A vehicle, comprising:
   a plurality of downwardly-directed optical sensors configured to be mounted to a vehicle to capture images of a ground surface, each of the plurality of downwardly-directed optical sensors having a respective field of view, and the plurality of downwardly-directed optical sensors arranged such that the respective fields of view differ from one another, wherein at least a subset of the plurality of downwardly-directed optical sensors are arranged to have respective fields of view that are positionally offset along a one-dimensional array, and wherein the subset of downwardly-directed optical sensors arranged to have respective fields of view that are positionally offset along the one-dimensional array includes first and second downwardly-directed optical sensors; and
   at least one processor coupled to the plurality of downwardly-directed optical sensors, the at least one processor configured to receive a plurality of images of the ground surface captured from the plurality of downwardly-directed optical sensors, process the plurality of images to determine a velocity of the vehicle, and autonomously control movement of the vehicle using the determined velocity, wherein the at least one processor is configured to process the plurality of images by correlating a first image captured at a first time by the first downwardly-directed optical sensor with a second image captured at a second time by the second downwardly-directed optical sensor to determine a positional displacement of the vehicle between the first and second times and determining the velocity based upon the determined positional displacement of the vehicle between the first and second times.

28. A non-transitory computer readable storage medium storing computer instructions executable by one or more processors to perform a method of autonomously operating a vehicle, comprising:
   receiving a plurality of images of a ground surface captured from a plurality of downwardly-directed optical sensors mounted to the vehicle, each of the plurality of downwardly-directed optical sensors having a respective field of view, and the plurality of downwardly-directed optical sensors arranged such that the respective fields of view differ from one another, wherein at least a subset of the plurality of downwardly-directed optical sensors are arranged to have respective fields of view that are positionally offset along a one-dimensional array, and wherein the subset of downwardly-directed optical sensors arranged to have respective fields of view that are positionally offset along the one-dimensional array includes first and second downwardly-directed optical sensors;
   processing the plurality of images using at least one processor to determine a velocity of the vehicle, including correlating a first image captured at a first time by the first downwardly-directed optical sensor with a second image captured at a second time by the second downwardly-directed optical sensor to determine a positional displacement of the vehicle between the first and second times and determining the velocity based upon the determined positional displacement of the vehicle between the first and second times; and
   autonomously controlling movement of the vehicle using the determined velocity.

\* \* \* \* \*